(12) United States Patent
Manetakis et al.

(10) Patent No.: US 12,489,477 B2
(45) Date of Patent: Dec. 2, 2025

(54) RF RECEIVER

(71) Applicant: CSEM Centre Suisse d'Electronique et de Microtechnique SA—Recherche et Développement, Neuchatel (CH)

(72) Inventors: Konstantinos Manetakis, Neuchatel (CH); Nicola Scolari, Lausanne (CH); Fabio Epifano, Ornex (FR)

(73) Assignee: CSEM Centre Suisse d'Electronique et de Microtechnique SA—Recherche et Développement, Neuchâtel (CH)

( * ) Notice: Subject to any disclaimer, the term of this patent is extended or adjusted under 35 U.S.C. 154(b) by 60 days.

(21) Appl. No.: 18/506,252

(22) Filed: Nov. 10, 2023

(65) Prior Publication Data
US 2024/0171202 A1    May 23, 2024

(51) Int. Cl.
*H04B 1/04* (2006.01)
*H04B 17/13* (2015.01)

(52) U.S. Cl.
CPC ........... *H04B 1/0475* (2013.01); *H04B 17/13* (2015.01)

(58) Field of Classification Search
CPC .............................. H04B 1/0475; H04B 17/13
USPC ........................................................... 375/297
See application file for complete search history.

(56) References Cited

U.S. PATENT DOCUMENTS

| 10,574,186 | B1* | 2/2020 | Emira | ................... | H03B 5/1209 |
| 2016/0248317 | A1* | 8/2016 | Taguchi | .............. | H02M 7/5387 |
| 2018/0006616 | A1* | 1/2018 | Avivi | ..................... | H03F 1/3252 |
| 2020/0336103 | A1* | 10/2020 | Broussev | ............. | H03B 5/1228 |
| 2020/0373892 | A1* | 11/2020 | Kim | ......................... | H03F 1/56 |
| 2021/0175855 | A1 | 6/2021 | Srinivasan et al. | | |

FOREIGN PATENT DOCUMENTS

| WO | 2020113953 A1 | 6/2020 |
| WO | 2021139746 A1 | 7/2021 |

OTHER PUBLICATIONS

Imran Bashir et al.; An Edge transmitter with mitigation of oscillator pulling, Radio Frequency Integrated Circuits Symposium (RFIC) May 2, 20103, pp. 13-16 (Year: 2010).*
Imran Bashir et al.; An Edge transmitter with mitigation of oscillator pulling, Radio Frequency Integrated Circuits Symposium (RFIC) May 2, 20103, pp. 13-16.
European Search Report issued in corresponding European Application No. 22206719.1; Mailing Date: Aug. 8, 2023.

* cited by examiner

*Primary Examiner* — Kevin M Burd
(74) *Attorney, Agent, or Firm* — McDonald Hopkins LLC

(57) ABSTRACT

A RF transmitter includes a phase-locked loop having an oscillator arranged to output an oscillator carrier and a power amplifier arranged to conduct a power amplifier current. The RF transmitter includes a phase shifter module between the phase-locked loop and the power amplifier arranged to introduce a phase shift between the oscillator carrier and a harmonic of the power amplifier current in order reduce a frequency shift of the oscillator carrier due to pushing and/or pulling.

10 Claims, 17 Drawing Sheets

PRIOR ART

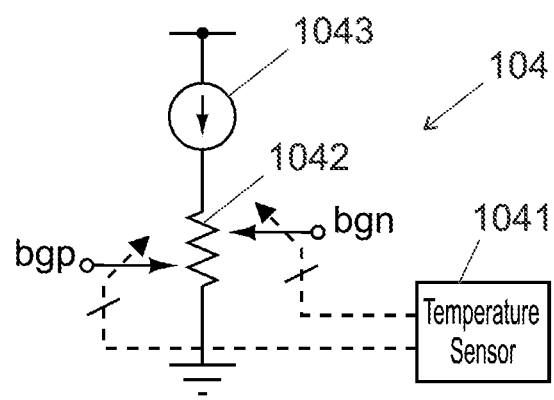
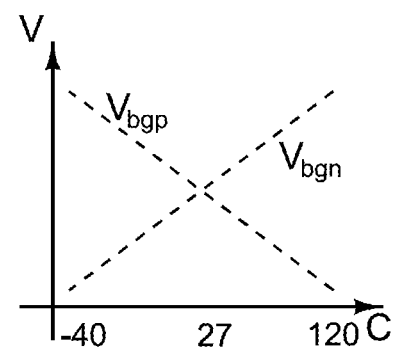
Fig. 10A          Fig. 10B
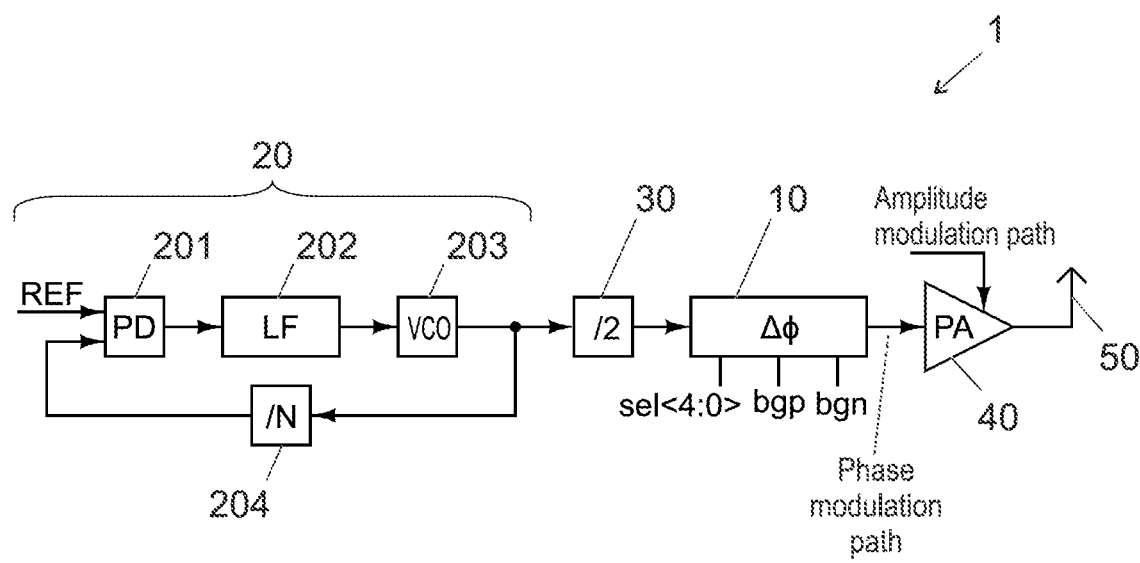
Fig. 11

PRIOR ART

RF RECEIVER

TECHNICAL DOMAIN

The present invention concerns a radio-frequency (RF) transmitter.

RELATED ART

In this context the term "RF" or the expression "radio-frequency" indicates a range of frequencies between 3 kHz and 300 GHz, in particular between 300 MHz and 100 GHz.

RF transmitters are well known and widely used, in communication devices (e.g., in portable or wearable devices), to perform signal transmission over one or multiple frequency bands according to communication standards, as for example Bluetooth (BT), Bluetooth Low Energy (BLE), WCDMA, CDMA, GSM, LTE standards for cellular telephony, IEEE 802.11 protocols for wireless LAN, etc.

FIG. 1 shows a known transmitter 1'. It comprises a phase locked loop (PLL) 20', which could be an all-digital PLL (ADPLL) and comprises a phase detector (PD) 201', followed by a loop filter (LF) 202' and an oscillator (a voltage controlled oscillator or VCO in the example) 203'. The signal generated by the oscillator 203' is divided by a number N at a divider 204' and fed back to the phase detector 201', which compares it to a reference signal REF.

In the example of FIG. 1, the oscillator 203' generates a frequency which is the double of the transmitted frequency at the antenna 50'. This frequency is then divided by 2 by a divider 30' and fed to a power amplifier (PA) 40', whose output is connected to the antenna 50'.

In this case, the second harmonic of the PA's current is at the same frequency as the oscillator, resulting in pushing and/or pulling.

In general, pushing is due to coupling from the PA to the oscillator electrical ports (supply, ground, etc.) and/or to the substrate; pulling is due to the magnetic coupling from the PA to the oscillator tank.

As the PA power is increased, the oscillator frequency is shifted away from the wanted value. The PLL tries then to correct for the frequency shift, but it is in general not fast enough.

This results in performance deterioration in terms of modulation quality metrics such as Error Vector Magnitude (EVM) and/or spectral regrowth.

Pulling can be estimated from EM simulations, but an accurate absolute prediction is very difficult. The pulling due to magnetic coupling from the PA to the oscillator can be estimated with the model shown in the FIG. 2.

An oscillator in general comprises:
a tank circuit, and
an active circuit (or active device) connected to the tank circuit, the active circuit comprising transistors.

The tank circuit provides a resonant frequency. In general, the tank circuit comprises an inductor and a capacitor, and the oscillator is named "LC-tuned oscillator." It can comprise a common mode part and a differential part and then a differential respectively common-mode tank impedance.

The active circuit allows to sustain the oscillation of the tank circuit. It can be modelled as a nonlinear transconductor G(V):

$$G(V) = g_1 V + g_2 V^2 + g_3 V^3 \quad (1)$$

wherein

V is the differential voltage across the active circuit, which in general correspond to the voltage across the tank circuit $g_1$ is the first-order transconductance of the active circuit as a whole $g_2$ is the second-order transconductance of the active circuit as a whole $g_3$ is the third-order transconductance of the active circuit as a whole.

An LC-tuned oscillator 203' is modelled in the FIG. 2 with a tank parallel circuit comprising the inductor $L_1$ and the capacitor C. The tank parallel loss is modelled with the tank parallel loss resistance $R_p$ and the active circuit with the transconductances $g_1$ and $g_3$. The inductor $L_1$ is coupled with the inductor $L_2$ of the balun of the PA 40' according to the following formula:

$$k = \frac{M}{\sqrt{L_1 L_2}} \quad (2)$$

where M is the mutual inductance between $L_1$ and $L_2$.

Starting from the phase-dynamics equation describing the time evolution of the LC-tuned oscillator phase in the presence of disturbances, and considering an injection current $i_{inj}$ into the tank of the LC-tuned oscillator due to the PA, as shown in the lower part of FIG. 2, it is possible to obtain the following equations:

$$v = V_p \cdot \sin(\omega t) \quad (3)$$

$$\frac{d\theta}{dt} = \omega_0 + i_{inj} \frac{\cos(\omega t)}{V_p C} \quad (4)$$

$$i_{inj} = i \frac{M}{L_1} \sin(\omega t + \Delta\varphi) \quad (5)$$

$$\omega_o \approx \frac{1}{\sqrt{LC}} \quad (6)$$

wherein
v is the oscillator voltage
$V_p$ is the oscillator peak voltage
ω is the oscillator carrier frequency
t is the time
θ is the oscillator phase
$\omega_0$ is the undisturbed oscillator carrier frequency
Δφ is injection current phase shift
$i_{inj}$ is the injection current into the tank due to the PA
i is the current into the tank.

This gives what is known in the literature as the Adler's formula:

$$\omega = \omega_o + \frac{i \cdot M/L_1}{2CV_p} \cdot \sin(\Delta\varphi) \quad (7)$$

which can be rewritten as:

$$\omega = \omega_o + \Delta\omega_p \cdot \sin(\Delta\varphi) \quad (8)$$

wherein $\Delta\omega_p$ is the oscillator peak pulling.

For example, with PA second harmonic current i=10 mA, VCO component values $L_1$=1.45 nH and C=700 fF (for 5 GHz center frequency), VCO peak swing $V_p$=1 V, the tiny amount of mutual inductance M=2.6 pH results in about 2

MHz peak pulling. Minute amounts of magnetic coupling result then in sizeable frequency shifts $\Delta\omega_p$.

Therefore, there is a need to alleviate pushing and/or pulling in RF transmitters.

There is a need to efficiently alleviate pushing and/or pulling in RF transmitters.

SHORT DISCLOSURE OF THE INVENTION

An aim of the present invention is the provision of a RF transmitter that overcomes the shortcomings and limitations of the state of the art.

Another aim of the invention is the provision of a RF transmitter wherein pushing and/or pulling is(are) alleviated.

Another aim of the invention is the provision of a RF transmitter wherein pushing and/or pulling is(are) efficiently alleviated.

According to the invention, these aims are attained by the object of the attached claims, and especially by the RF transmitter of claim 1, whereas dependent claims deal with alternative and preferred embodiments of the invention.

The RF transmitter according to the invention comprises:
a phase-locked loop, comprising an oscillator arranged to output an oscillator carrier, and
a power amplifier, arranged to conduct a power amplifier current.

According to the invention, the RF transmitter comprises a phase shifter module between the phase-locked loop and the power amplifier, arranged to introduce a phase shift between the oscillator carrier and a harmonic of the power amplifier current, in order to reduce a frequency shift of the oscillator carrier due to pushing and/or pulling.

Thanks to the presence of the claimed phase shifter module, frequency shifts of the oscillator carrier due to pushing and/or pulling are efficiently reduced: the proposed RF transmitter offers significant performance benefits in terms of modulation quality metrics such as EVM and/or spectral regrowth.

In one embodiment, the RF transmitter comprises a divider connected to the output of the oscillator and being arranged to divide the frequency of the oscillator carrier by a number, e.g. an integer and positive number, the phase shifter module being between the divider and the power amplifier. In one embodiment, this number is equal to two.

In one embodiment, the RF transmitter comprises a divider connected to the output of the oscillator and being arranged to divide the frequency of the oscillator carrier by a number, e.g. an integer and positive number, the phase shifter module being between phase-locked loop and the divider. In one embodiment, this number is equal to two.

In both the embodiments comprising the divider, if the divider is arranged to divide the frequency of its input signal by two, the phase shifter module is arranged to introduce a phase shift between the oscillator carrier and the second harmonic of the power amplifier current.

In general, in both the embodiments comprising the divider, if the divider is arranged to divide the frequency of its input signal by an integer number N, the phase shifter module is arranged to introduce a phase shift between the oscillator carrier and the Nth harmonic of the power amplifier current.

In the absence of a divider, the phase shifter module is arranged to introduce a phase shift between the oscillator carrier and the first harmonic of the power amplifier current.

In one embodiment, the phase shift of the phase shifter module is a variable phase shift, i.e. the phase shift can be varied, e.g. automatically varied.

In one embodiment, the RF transmitter comprises a computing unit and an oscillator frequency shift measurement unit, wherein:
the power amplifier is arranged to be ramped-up during a calibration phase,
the phase shifter module is arranged so that during this calibration phase, the variable phase shift takes different values,
the measurement unit is arranged to measure the oscillator frequency shift against a load power for each value of the phase shift,
the computing unit is arranged to select the value of the phase shift minimizing a peak-peak oscillator frequency shift against the load power.

In one embodiment, the variable phase shift takes different values by stepping the phase shift, as the frequency shift is not monotonic with the phase shift.

In one embodiment, the measurement unit is the phase-locked loop.

In one embodiment, the phase-locked loop is an all-digital phase-locked loop.

In one embodiment, the phase-locked loop comprises a phase detector module and an additional module connected to an output of the phase detector module, the additional module being arranged so as to compute the oscillator frequency shift.

In one embodiment, the phase shifter module comprises several selectable delay cells, each delay cell comprising several inverters.

In one embodiment, each delay cell comprises back-to-back inverters so as to control the duty-cycle of a clock arranged to drive the PA. Controlling this duty cycle allows to control (and in particular minimize) the level of the second harmonic current of the power amplifier, which is inherent in this clock.

In one embodiment, the inverters comprise transistors, the phase shifter module comprising a control module, arranged to control a fourth terminal of at least some transistors for temperature compensation.

In this context, the fourth terminal is the terminal allowing to modify a threshold voltage of the transistor. In one embodiment, the fourth terminal is the bulk terminal of those transistor. In another embodiment, in particular if the transistors are realised in the technology silicon on insulator (SOI) or fully depleted silicon on insulator (FDSOI), the fourth terminal is the back gate terminal of the transistors. In another embodiment in which the transistors comprise two gate terminals, the fourth terminal is one of the two gate terminals In one embodiment, the control module comprises:
a temperature sensor,
a potentiometer comprising a p-output and a n-output, the temperature sensor being arranged to control the n-output and the p-output, the n-output and the p-output being arranged to collectively control the fourth terminals of the N-type respectively P-type transistors of the inverters.

In one embodiment, the fourth terminal of the N-type transistor has a PTAT (proportional to absolute temperature) behaviour, and the fourth terminal of the P-type transistor has a CTAT (complementary to absolute temperature) behaviour.

In one embodiment, as the power amplifier is ramped up and the measurement unit measures the frequency shift, the computing unit is arranged to build a frequency shift-signal envelope look-up table. In this context, the signal envelope is the envelope of the PA output (AM) modulation signal.

In one embodiment, after the calibration phase (in one example, during the enhanced data rate (EDR) part of a Bluetooth EDR packet), a predistortion signal based on said look-up table is added to an oscillator frequency control input, in order to reduce further the frequency shift of the oscillator carrier due to pushing and/or pulling.

In one embodiment, an inductor of the oscillator is designed so as to reduce a magnetic coupling between the inductor and a balun of the power amplifier, an oscillator electrical port and/or a substrate.

In one embodiment, the inductor has an eight shape.

In one embodiment, the distance and orientation between the oscillator inductor and the balun of the power amplifier, is(are) arranged so as to reduce said magnetic coupling.

In one embodiment, the power amplifier comprises a power amplifier decoupling capacitor and a tank (or filter), the tank sharing a terminal with a terminal of the decoupling capacitor and having an impedance at the harmonic equal or higher than 100Ω), in particular equal or higher than a few hundred ohms, for example equal or higher than 1 KΩ in order to reduce or impede a flow of said harmonic current to reach the power amplifier decoupling capacitor.

SHORT DESCRIPTION OF THE DRAWINGS

Exemplar embodiments of the invention are disclosed in the description and illustrated by the drawings in which:

FIG. 10A shows one embodiment of a control module, arranged to control a fourth terminal of at least some transistors of the individual inverters of FIG. 8B.

FIG. 10B shows that, in one embodiment, the p-output bgp of the control module of FIG. 10A exhibits a CTAT behaviour, while the n-output bgn exhibits a PTAT behaviour.

FIG. 11 shows one embodiment of a RF transmitter according to the invention.

EXAMPLES OF EMBODIMENTS OF THE PRESENT INVENTION

In the following context, the term "harmonic" refers to a harmonic of the power amplifier current, unless otherwise specified.

Figure 1:
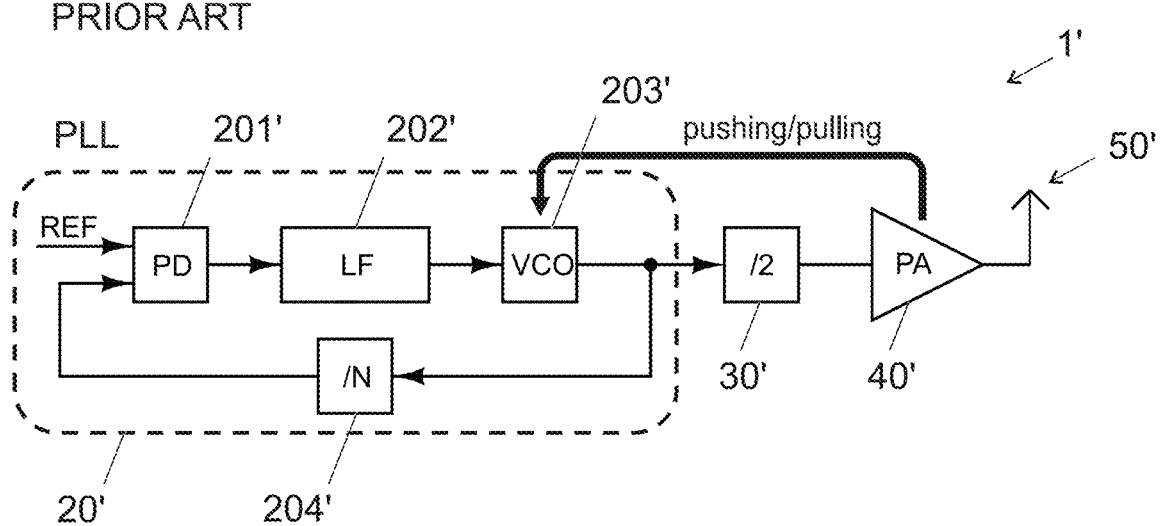
FIG. 1 shows a known transmitter architecture.
Figure 2:
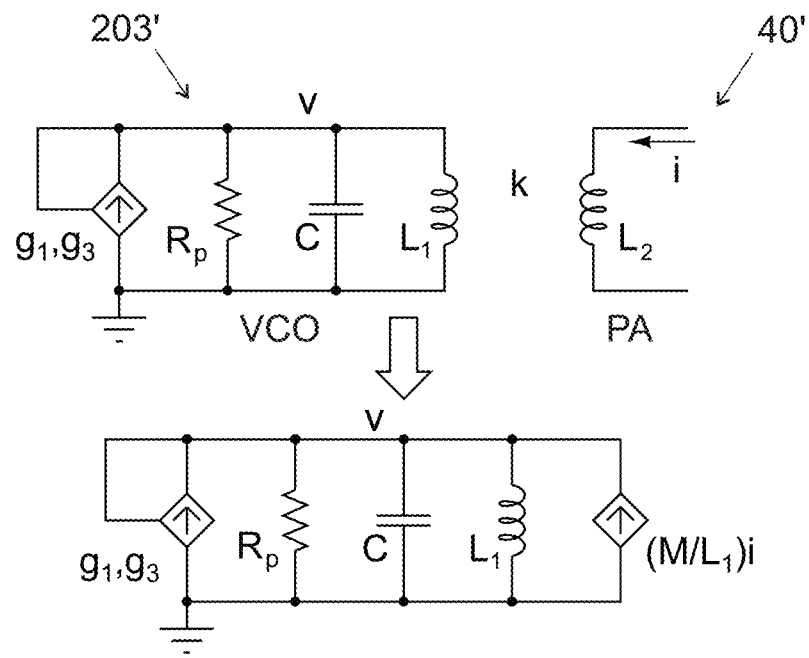
FIG. 2 shows a model of the pulling due to magnetic coupling from the PA to the LC-tuned oscillator.
Figure 3:
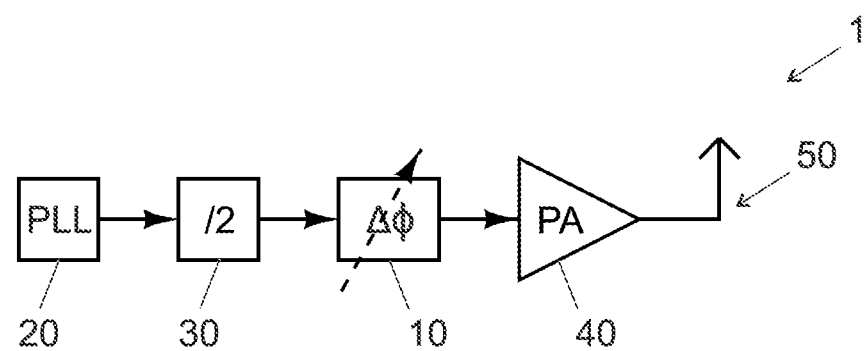
FIG. 3 shows one embodiment of a RF transmitter according to the invention.

FIG. 3 shows one embodiment of a RF transmitter 1 according to the invention. The RF transmitter 1 according to the invention comprises:
  a phase-locked loop 20, comprising an oscillator (not illustrated in FIG. 3) arranged to output an oscillator carrier, and
  a power amplifier 40, arranged to conduct a power amplifier current.

According to the invention, the RF transmitter comprises a phase shifter module 10 between the phase-locked loop 20 and the power amplifier 40, arranged to introduce a phase shift between the oscillator carrier and a harmonic of the power amplifier current, in order reduce a frequency shift of the oscillator carrier due to pushing and/or pulling.

Thanks to the presence of the claimed phase shifter module 10, frequency shifts of the oscillator carrier due to pushing and/or pulling are efficiently reduced: the proposed RF transmitter offers significant performance benefits in terms of modulation quality metrics such as EVM and/or spectral regrowth.

In one embodiment, phase shifter module 10 allows the PA current to be in phase or in anti-phase with the oscillator carrier, which results in no frequency pulling or in a reduced frequency pulling.

The Adler's formula applied to the RF transmitter according to the invention can be rewritten as follows:

$$\omega = \omega_o + \frac{i_2 \cdot M/L_1}{2CV_p} \cdot \sin(\theta_2 + \Delta\varphi) \quad (9)$$

wherein
- $\omega$ is the oscillator carrier frequency
- $\omega_0$ is the unperturbed oscillator carrier frequency
- $i_2$ is the PA second harmonic current amplitude
- M is the mutual inductance between the oscillator tank inductor $L_1$ and the inductor $L_2$ of the balun of the PA
- $L_1$ is the inductor of the tank parallel circuit of the LC-tuned oscillator
- C is the capacitor of the tank parallel circuit of the LC-tuned oscillator
- $V_p$ is the oscillator peak voltage
- $\theta_2$ is the phase shift between $i_2$ and the oscillator carrier
- $\Delta\varphi$ is the phase shift introduced by the phase shifter.

Effectively adjusting the phase shift $\Delta\phi$ of the phase shifter module 10 allows to operate under the condition $\sin(\theta 2+\Delta\varphi)\approx 0$ in formula (9), thus minimizing pulling.

In the embodiment of FIG. 3, the RF transmitter 1 comprises a divider 30 connected to the output of the oscillator of the PLL 20 and being arranged to divide the frequency of the oscillator carrier by a number, e.g. an integer and positive number (two in the embodiment of FIG. 3), and the phase shifter module 10 is between the divider 30 and the power amplifier 40.

In one embodiment (not illustrated), the phase shifter module 10 is between phase-locked loop 20 and the divider 30.

In general, if the divider 30 is arranged to divide the frequency of its input signal by an integer number N, the phase shifter module 10 is arranged to introduce a phase shift between the oscillator carrier and the Nth harmonic of the power amplifier current.

In the absence of a divider, the phase shifter module 10 is arranged to introduce a phase shift between the oscillator carrier and the first harmonic of the power amplifier current.

In one embodiment, the phase shift of the phase shifter module is a variable phase shift, i.e. the phase shift can be varied.

The second harmonic of the PA usually exhibits wide AM-AM and AM-PM, wherein as usual AM indicates an amplitude modulation (modulation format with variable envelope) and PM a phase modulation. This means that the signal coupling magnetically to the LC-tuned oscillator has both amplitude and phase variations that depend on the modulation envelope of the PA 40.

The following formula (which could be considered as the "practical" form of the formula (9)) takes into consideration this fact:

$$\omega = \omega_o + \frac{i_2(r) \cdot M/L_1}{2CV_p} \cdot \sin[\theta_2(r) + \Delta\varphi] \quad (10)$$

wherein
- $i_2(r)$ is the PA second harmonic current amplitude
- $\theta_2(r)$ is the PA second harmonic current phase
- r is the modulation envelope which is a function of time r(t)

Both the PA second harmonic current amplitude and the PA second harmonic current phase depend on the modulation envelope r(t).

Figure 4:
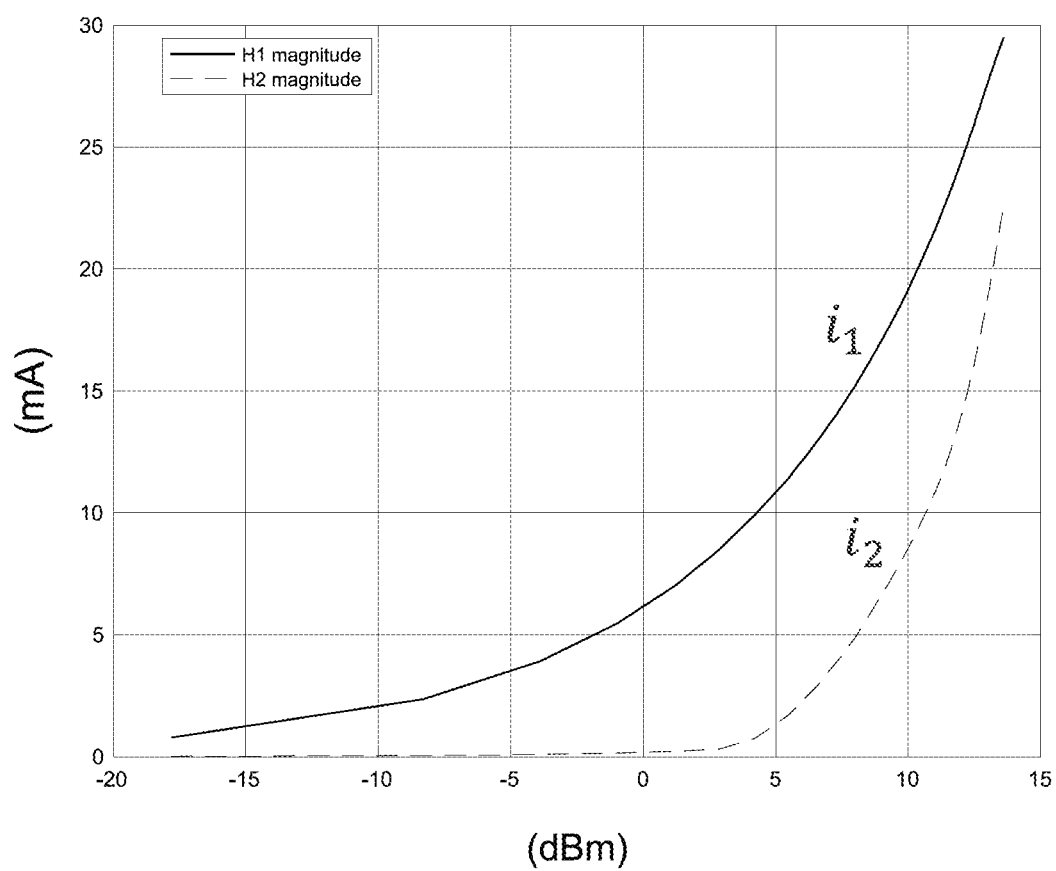
FIG. 4 shows the PA first and second harmonic current magnitudes in mA against load power in dBm for one embodiment of the RF transmitter according to the invention.
Figure 5:
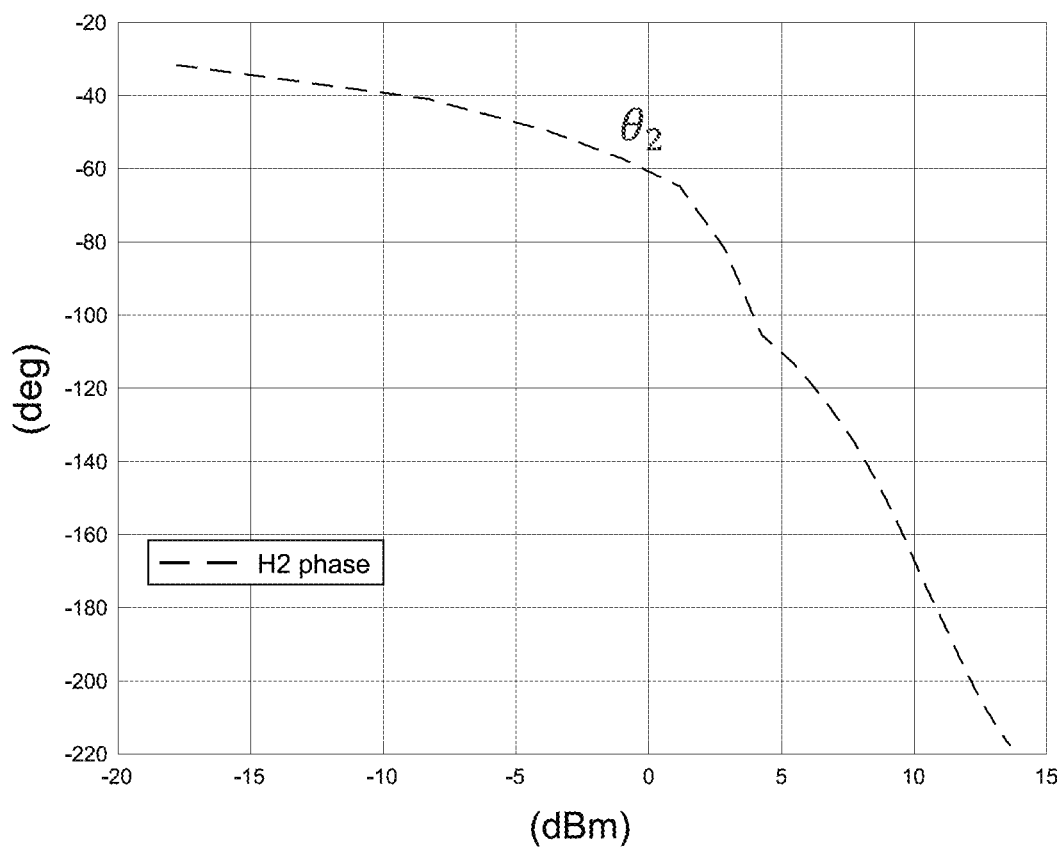
FIG. 5 shows the PA second harmonic phase in degrees against load power in dBm for one embodiment of the RF transmitter according to the invention.
Figure 6:
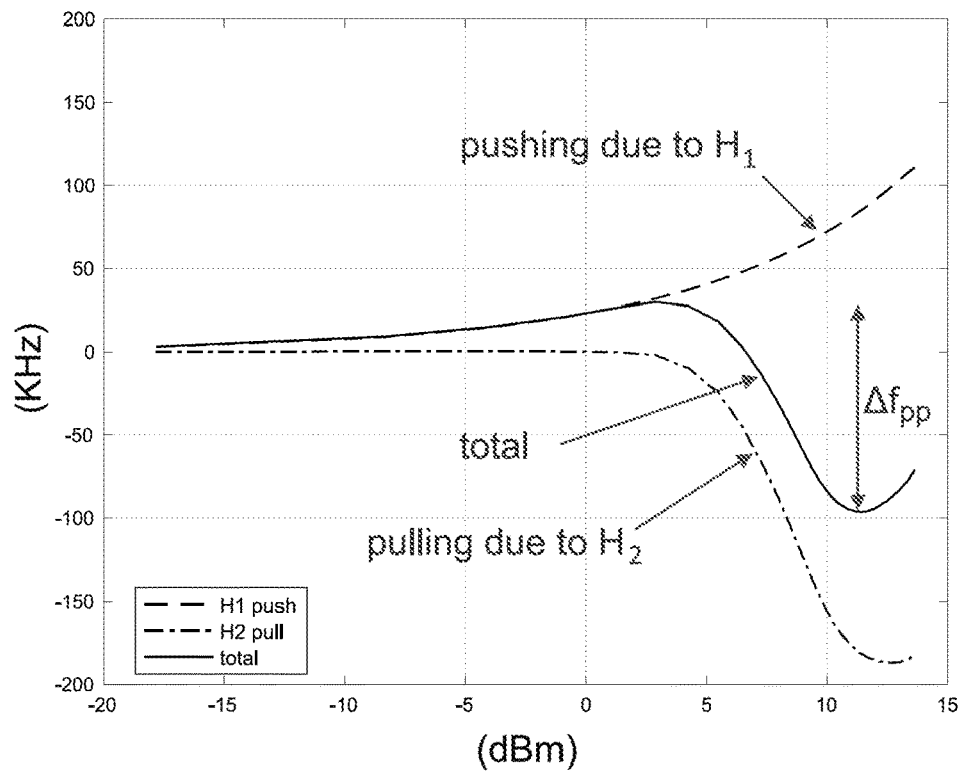
FIG. 6 shows the LC-tuned oscillator frequency shift after the divider due to the combined effect of pushing from the first PA harmonic and pulling from the second PA harmonic in KHz against load power in dBm for one embodiment of the RF transmitter according to the invention.

It is then possible to find a value for $\Delta\varphi$ that guarantees a relatively small frequency pulling against the overall modulation envelope variation, as illustrated in FIGS. 4 to 6.

FIG. 4 shows the PA first and second harmonic current magnitudes in mA against load power in dBm for one embodiment of the RF transmitter according to the invention.

FIG. 5 which shows the PA second harmonic phase in degrees against load power in dBm for one embodiment of the RF transmitter according to the invention.

FIG. 6 shows the LC-tuned oscillator frequency shift after the divider 30 due to the combined effect of pushing from the first PA harmonic $H_1$ and pulling from the second PA harmonic $H_2$ in KHz against load power in dBm for one embodiment of the RF transmitter according to the invention.

In FIG. 6, for low output power levels pushing dominates, while at high output powers pulling takes over.

A formula that adequately describes the total behavior is the following:

$$\omega = \omega_o + k \cdot i_1(r) + \frac{i_2(r) \cdot M/L_1}{2CV_p} \cdot \sin[\theta_2(r) + \Delta\varphi] \quad (11)$$

wherein
- k is a scale factor in (rad/sec per A)
- $i_1(r)$ is the PA first harmonic current amplitude Formula (11) contains with respect to formula (10) an additional pushing term $k \cdot i_1(r)$, for taking into account the pushing effect for low output power levels.

Therefore, the phase shifter module 10 allows to reduce a frequency shift of the oscillator carrier due to pushing effect as well.

The peak to peak frequency shift in FIG. 6 is indicated as $\Delta f_{pp}$.

Figure 7:
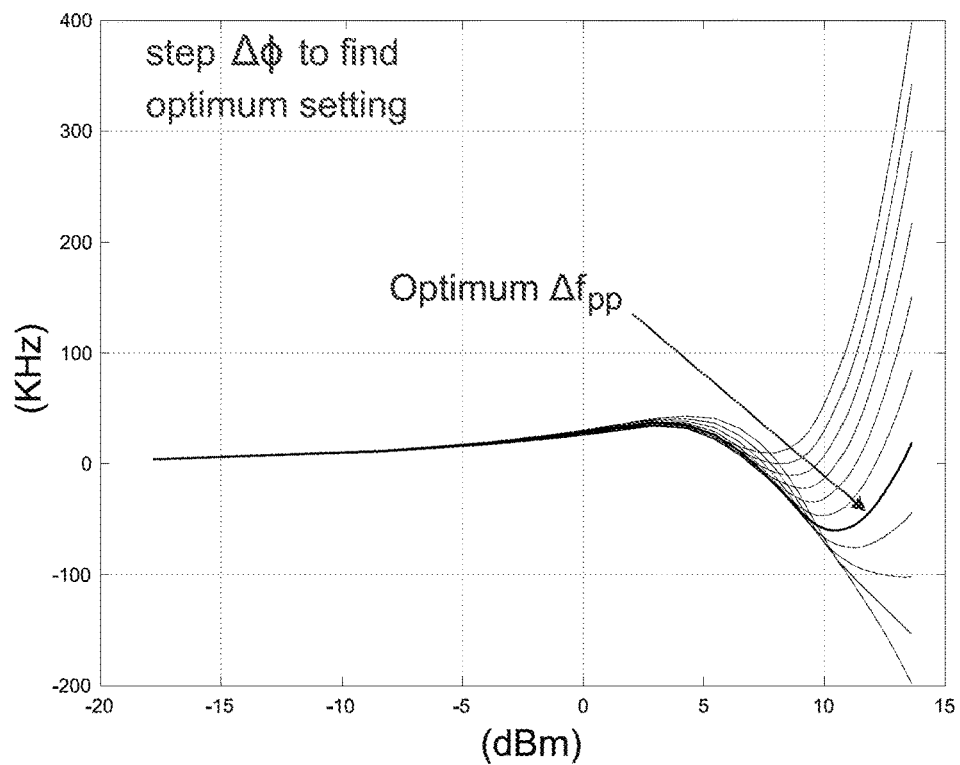
FIG. 7 shows the LC-tuned oscillator frequency shift in KHz after the divider with different values of the phase shifter module (4) against load power in dBm for one embodiment of the RF transmitter according to the invention.

FIG. 7 shows the LC-tuned oscillator frequency in KHz after the divider with different values of the phase shifter module ($\Delta\phi$) against load power in dBm for one embodiment of the RF transmitter according to the invention.

In one embodiment, by sweeping $\Delta\phi$ allows to minimize the peak-peak frequency shift $\Delta f_{pp}$ against the load power.

In one embodiment, the step to find an optimum value for the phase shifter module is done during the RF transmitter start-up. The PA 40 is ramped up repeatedly and the algorithm steps $\Delta\phi$ and seeks to find the minimum peak-peak frequency shift $\Delta f_{pp}$.

In this embodiment, the RF transmitter comprises a computing unit (not illustrated) and an oscillator frequency shift measurement unit (not illustrated), wherein the power amplifier 40 is arranged to be ramped-up during a calibration phase, the phase shifter module 10 is arranged so that during this calibration phase, the variable phase shift $\Delta\phi$ takes different values, the measurement unit is arranged to measure the oscillator frequency shift against a load power for each value of the phase shift $\Delta\phi$, the computing unit is arranged to select the value of the phase shift minimizing a peak-peak oscillator frequency shift $\Delta f_{pp}$ against the load power.

In one embodiment, the variable phase shift $\Delta\phi$ takes different values by stepping the phase shift, as the frequency shift is not monotonic with the phase shift $\Delta\phi$.

The calibration can effectively compensate for process and supply variation in the RF transmitter 1. After the calibration, only temperature may affect the phase shifter module.

Figures 8A, 8B, 8C:
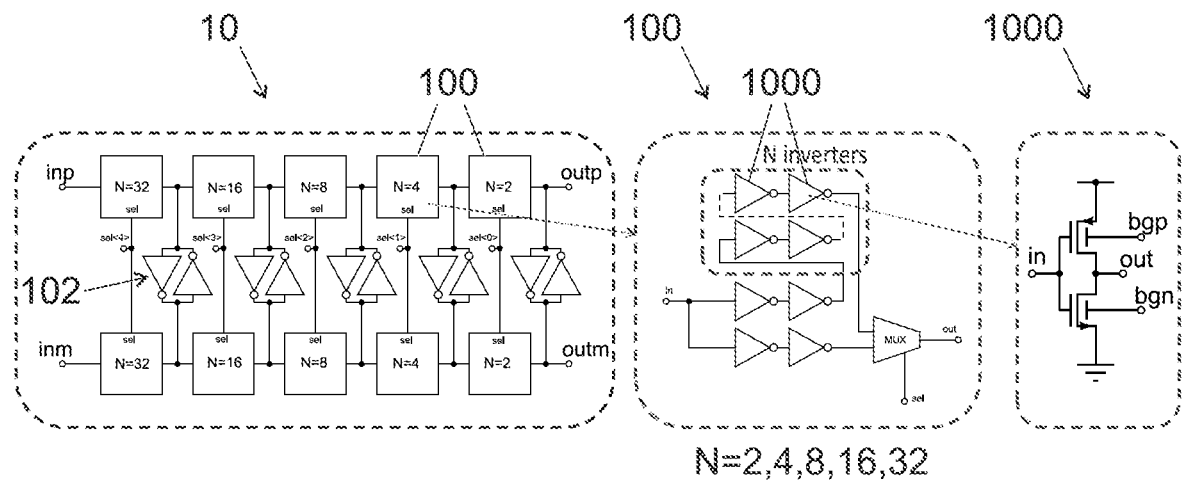
FIG. 8A shows one embodiment of the phase shifter module of the RF transmitter according to the invention.
FIG. 8B shows one embodiment of the internals of the individual delay cells of the phase shifter module of FIG. 8A.
FIG. 8C shows one embodiment of the individual inverter of an individual delay cell of FIG. 8B.

FIG. 8A shows one embodiment of the phase shifter module 10 of the RF transmitter 1 according to the invention. It comprises two lines (for a differential control), each line comprising one or more cells 100 (five in FIG. 8A), the phase shifter module 10 being arranged so as to select a specific cell 100 via the terminals sel<0>, sel<1>, sel<2>, etc. and then have a specific phase shift according to the needs.

Figure 9:
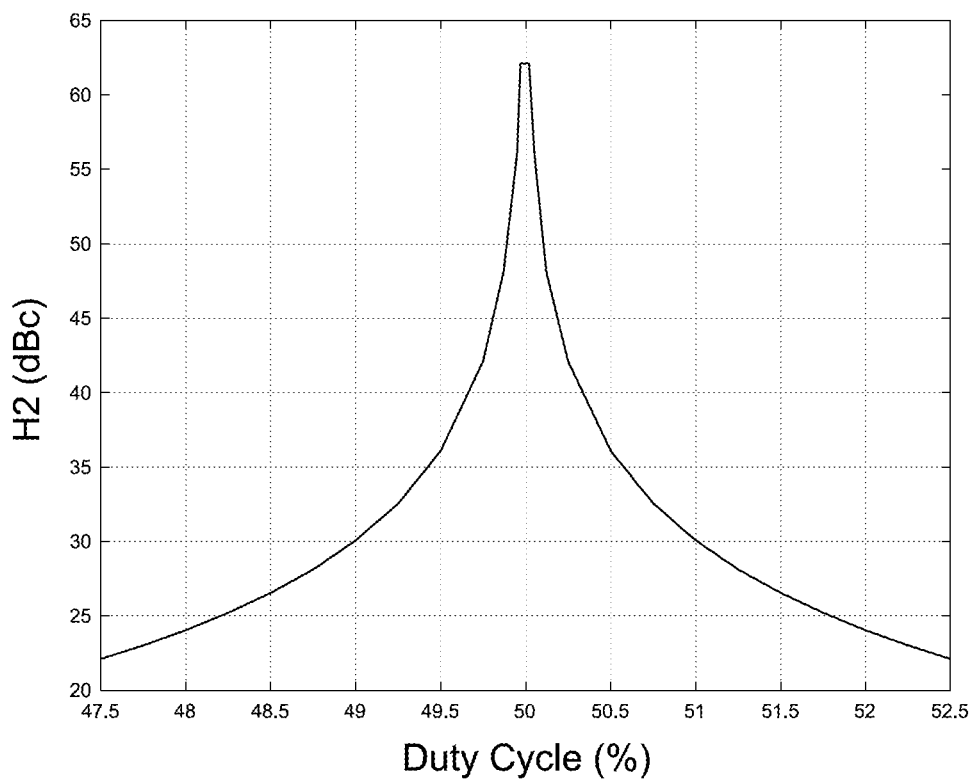
FIG. 9 shows the difference between the PA first and second harmonic in dBc against the duty-cycle of the clock that drives the PA in percentage for one embodiment of the RF transmitter according to the invention.

The back-to-back inverters 102 between the two lines are not necessary for introducing the phase shift. However, where present, they allow to control the duty-cycle of a clock arranged to drive the PA 50. Controlling this duty cycle allows to control (and in particular minimize) the level of the $H_2$ component of the power amplifier, which is inherent in this clock, as illustrated in FIG. 9, which shows the difference between the PA first $H_1$ and second harmonic $H_2$ in dBc against the duty-cycle of the clock that drives the PA in percentage. In one embodiment, back-to-back inverters 102 guarantee 50% duty cycle.

FIG. 8B shows one embodiment of the internals of the individual delay cells 100 of the phase shifter module 10 of FIG. 8A. Each cell 100 comprises N inverters 1000, wherein N could be equal for example to 2, 4, 6, 16, 32. A multiplexer MUX and the selection signal sel allow to select if a delay N is introduced, or if there is no delay.

FIG. 8C shows one embodiment of the individual (and known) inverter 1000 of an individual delay cell 100 of FIG. 8B.

As discussed, after the calibration, only temperature may affect the phase shifter module. In one embodiment, (individual or collective) control of the fourth terminals bgp and bgn inverters' P- respectively N-transistors allows for temperature compensation of the overall phase shift.

In one embodiment, the phase shifter module 10 comprises a control module 104, illustrated in FIG. 10A, arranged to control the fourth terminals bgp and bgn of at least some transistors of the inverters 1000 for temperature compensation.

In this context, the fourth terminal is the terminal allowing to modify a threshold voltage of the transistor. In one embodiment, the fourth terminal is the bulk terminal of those transistor. In another embodiment, in particular if the transistors are realised in the technology silicon on insulator (SIO) or fully depleted silicon on insulator (FDSOI), the fourth terminal is the back gate terminal of the transistors. In another embodiment in which the transistors comprise two gate terminals, the fourth terminal is one of the two gate terminals In the embodiment of FIG. 10A, the control module 104 comprises:

a temperature sensor 1041, a potentiometer 1042, comprising a p-output bgp and a n-output bgn.

In the embodiment of FIG. 10A, the potentiometer 1042 is placed between a current source 1043 and the ground.

In this embodiment, the temperature sensor 1041 is arranged to control the p-output bgp and the n-output bgn, and the n-output and the p-output are arranged to (collectively) control the fourth terminals of the N-type respectively P-type transistors of the inverters 1000.

In other words, the temperature sensor 1041 controls two separate outputs bgp and bgn of a (digital) potentiometer. These outputs (collectively) control the -output bgp and a n-output bgn in inverters 1000 of the phase shifter module 10.

In one embodiment, the temperature steps provided by the temperature sensor 1041 are in the range of 10° C. to 20° C.

FIG. 10B shows that, in one embodiment, the p-output bgp of the control module 104 of FIG. 10A exhibits a CTAT (complementary to absolute temperature) behaviour, while the n-output bgn exhibits a PTAT (proportional to absolute temperature) behaviour.

FIG. 11 shows one embodiment of a RF transmitter 1 according to the invention. In this embodiment, the PLL 20 is an ADPLL and the phase shifter module 10 is placed between the divider by two 30 and the power amplifier 40, with its phase modulation and amplitude modulation paths. The output of the phase shifter module 10 is connected (directly connected in FIG. 11) to the phase modulation path of the power amplifier 40. The phase shifter module 10 comprises one input sel<4:0> for selecting the desired phase shift and two inputs bgp and bgn for the automatic temperature compensation.

In one embodiment, the measurement unit is the phase-locked loop. In one embodiment, the measurement unit is an all digital phase-locked loop.

Figure 12:
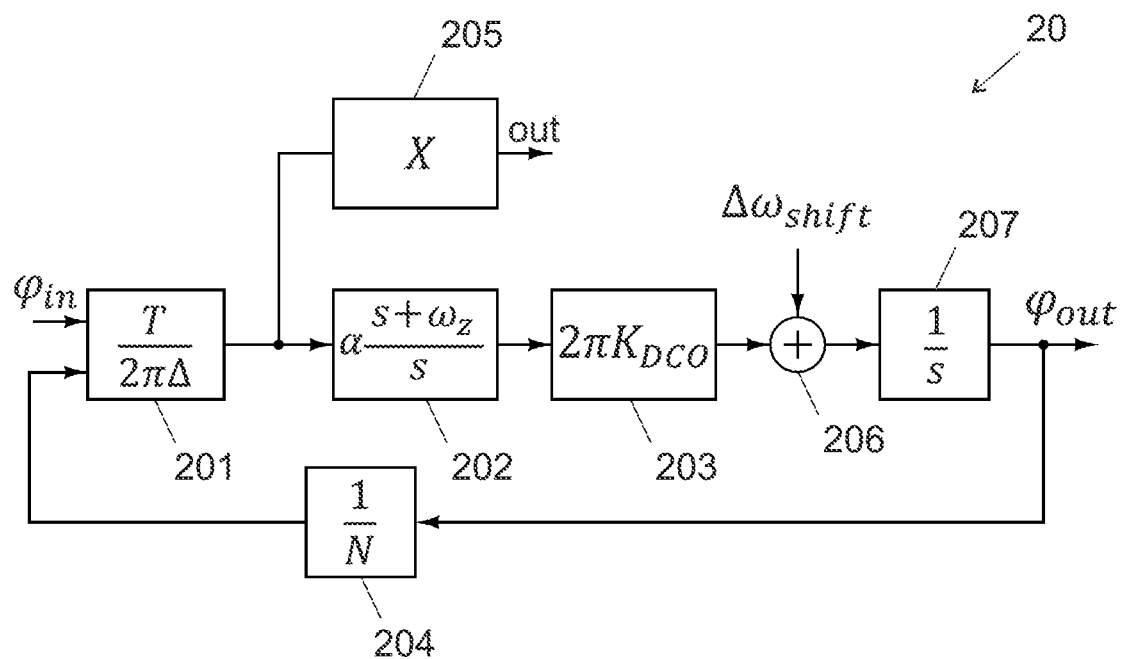
FIG. 12 shows one embodiment of an all digital phase-locked loop for measuring the frequency shift of the LC-tuned oscillator as the PA power ramps up.

FIG. 12 shows one embodiment of a s-domain, type-II model all digital phase-locked loop for measuring the frequency shift of the LC-tuned oscillator as the PA power ramps up. However, the s-domain, type-II model all digital phase-locked loop of FIG. 12 should not be considered as limitative, and other types of PLL could be used instead. The use of an all digital phase-locked loop is not essential for the embodiment of FIG. 12.

In one embodiment, the phase-locked loop comprises an additional module (reference 205 in FIG. 12) connected to an output of the phase detector module 201, the additional module 205 being arranged to compute the oscillator frequency shift.

In other words, the additional module 205 cancels out the (AD)PLL dynamics. These dynamics are known once the (AD)PLL calibration is already finished.

The output of the additional module 205 gives the ratio $\Delta f_{shift}/K_{DCO}$ as illustrated in the following formula $$\frac{out}{\Delta \omega_{shift}} = \left(\frac{1}{2\pi K_{DCO}}\right) \cdot \frac{\omega_p}{s+\omega_p} \qquad (12)$$

$$X = \left(\frac{1}{2\pi K_{DCO}}\right) \cdot \frac{s^2 + 2\zeta\omega_n s + \omega_n^2}{s \frac{K_{TDC}}{N}} \cdot \frac{\omega_p}{s + \omega_p} \quad (13)$$

wherein out is the output signal of the additional module
$K_{DCO}$ is the oscillator gain
$K_{TDC}$ is the phase detector module gain
$\omega_p = 2\pi f_p$ is the bandwidth of the measurement
$\omega_n$ is ADPLL natural angular frequency
N is the ADPLL feedback divider
$\zeta$ is the ADPLL damping factor The bandwidth of the measurement is $f_p$. It can be set depending on the PA ramp up speed and is not limited by the ADPLL bandwidth.

Figure 13:
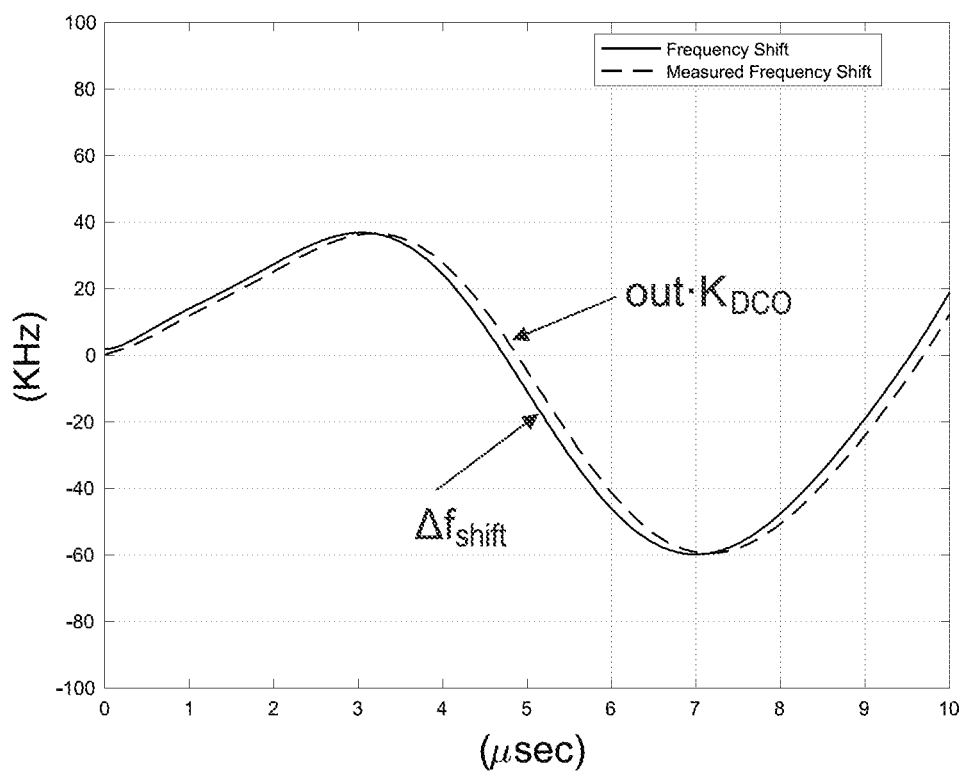
FIG. 13 shows the frequency shift in KHz and the measured value in KHz against time in µs at the output of the additional module X of FIG. 12.

FIG. 13 shows the frequency shift in KHz and the measured value in KHz against time in µs at the output of the additional module 205 of FIG. 12. In this case, the PA ramp up is set to 10 µsec and the measuring bandwidth to 1 MHz ($f_p = 1$ MHz). $K_{DCO}$ is set to 25 KHz/step.

As illustrated in FIG. 13, the output out of the additional module 205 is directly proportional to the frequency shift $\Delta f_{shift}$ and inversely proportional to the oscillator gain $K_{DCO}$. The term $2\pi f_p/(s + 2\pi f_p)$ represents a low-pass filter function and is the bandwidth of the measurement.

$$\text{out} = \left(\frac{\Delta f_{shift}}{K_{DCO}}\right) \frac{2\pi f_p}{s + 2\pi f_p} \quad (14)$$

Figure 14:
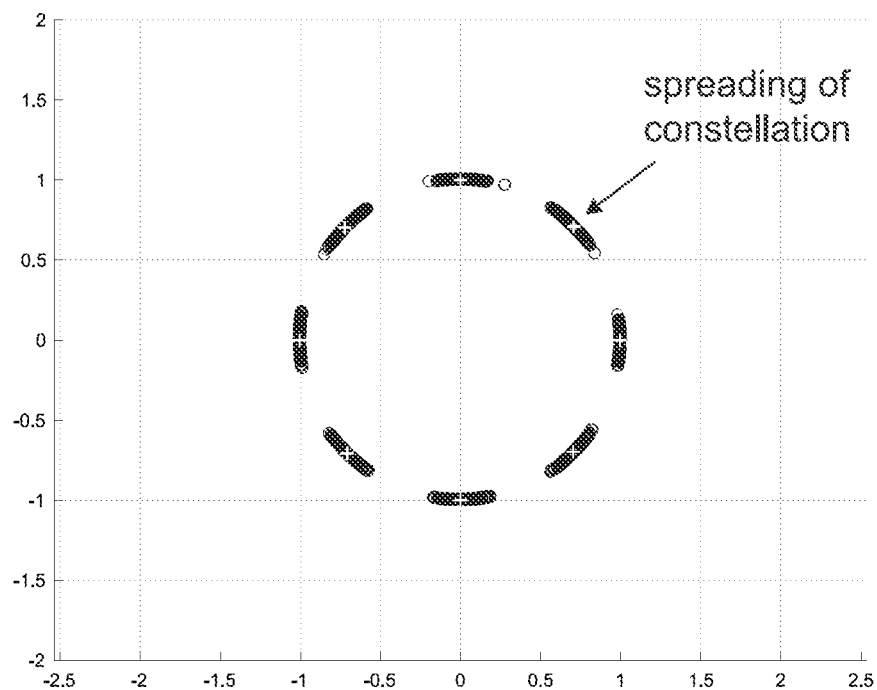
FIG. 14 shows a constellation for a BT EDR version 2 modulation given the frequency shift of FIG. 13.
Figure 15:
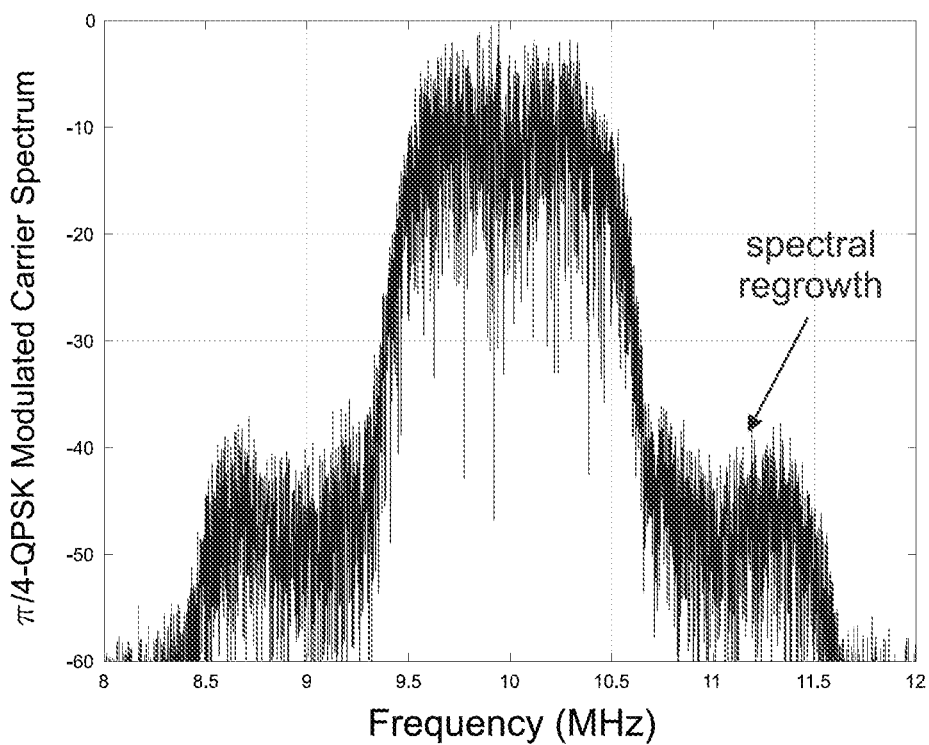
FIG. 15 shows the spectrum for an BT EDR version 2 modulation given the frequency shift of FIG. 13.

FIG. 14 shows a constellation for an BT EDR version 2 modulation given the frequency shift of FIG. 13. It is possible to note the spreading of the constellation with regard to the ideal bits (each one being represented by a cross). FIG. 15 shows a spectrum for an BT EDR version 2 modulation given the frequency shift of FIG. 13. The estimated EVM is 9.3% (the ADPLL bandwidth is 200 KHz).

In one embodiment, as the power amplifier is ramped up and the measurement unit measures the frequency shift, the computing unit is arranged to build a frequency shift-signal envelope look-up table. In this context, the signal envelope is the envelope of the PA output (AM) modulation signal.

In one embodiment, after the calibration phase (in one example, during the enhanced data rate (EDR) part of a Bluetooth EDR packet), a predistortion signal based on said look-up table is added to an oscillator frequency control input, in order to reduce further (i.e. in addition to what is achievable with the phase shifter module alone) the frequency shift of the oscillator carrier due to pushing and/or pulling.

In other words, the use of an AM-FM digital predistortion allows to remove a remaining frequency shift, after the phase shifter module has already set the phase shift to its optimal value to guarantee small peak-peak frequency shift.

As the PA is ramped up at the beginning of each frame, the PLL can be used to sample the remaining frequency shift. It is possible thus to build a [frequency shift-signal envelope] look-up table during the ramp up.

This information is subsequently used during the remaining part of the frame as a AM-FM predistortion signal added to the VCO frequency control input, in order to cancel the frequency shift due to pushing/pulling.

Figure 16:
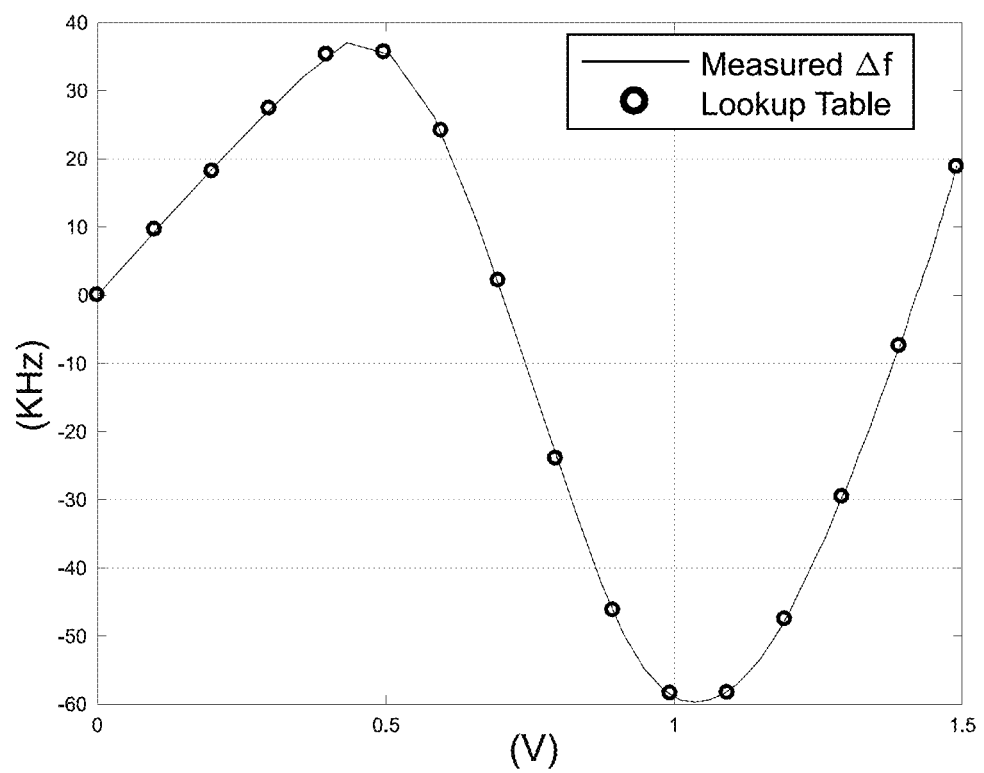
FIG. 16 shows the measured frequency shift in KHz against the PA envelope in Volts. The values of a [frequency shift-signal envelope] look-up table are shown as well.

The measured frequency shift and the lookup table values (4-bits) are shown in the FIG. 16. The values of a [frequency shift-signal envelope] look-up table are shown as well. In this embodiment, a 4-bit look-up table is used.

Figure 17:
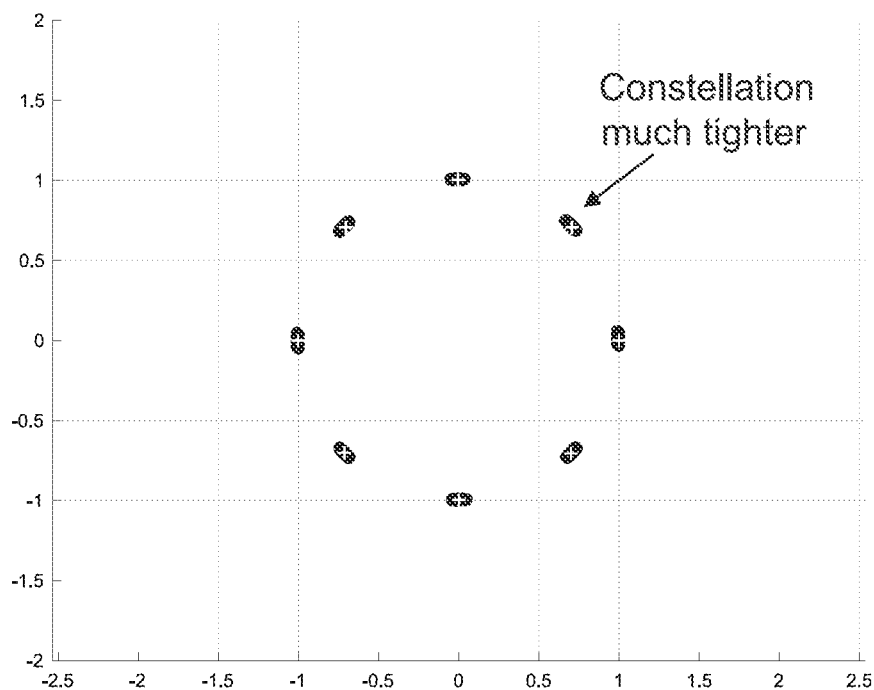
FIG. 17 shows a constellation for an BT EDR version 2 modulation after an AM-FM digital predistortion.
Figure 18:
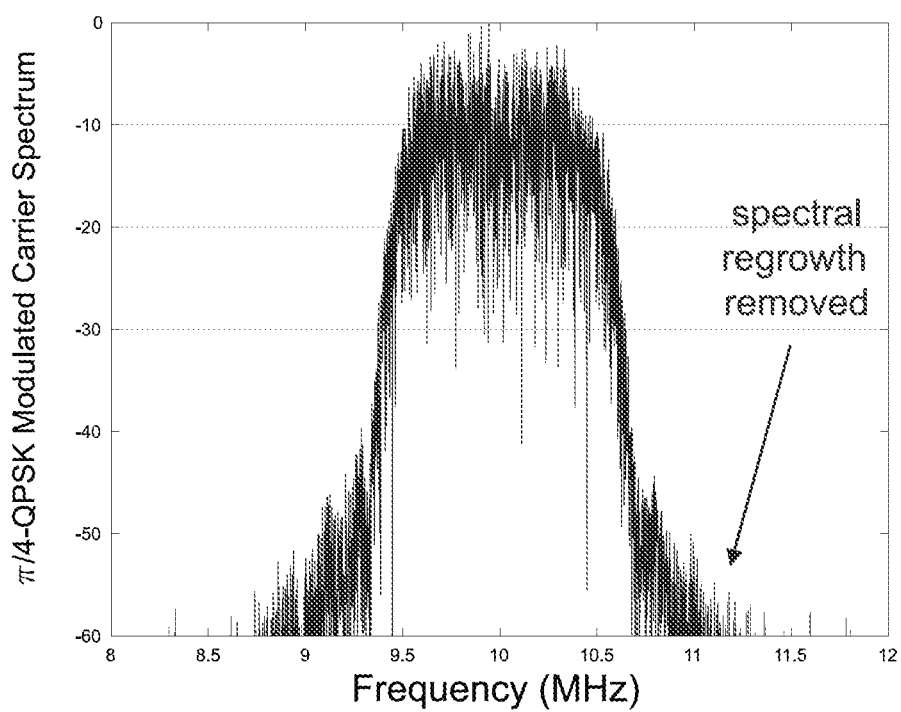
FIG. 18 shows the spectrum for an BT EDR version 2 modulation after the AM-FM digital predistortion as in FIG. 17.

FIG. 17 shows a constellation for an BT EDR version 2 modulation after an AM-FM digital predistortion, and FIG. 18 shows a spectrum for an BT EDR version 2 modulation after the AM-FM digital predistortion as in FIG. 17. The estimated EVM is 1.8%, exhibiting a significant reduction (the ADPLL bandwidth is 200 KHz). In FIGS. 17 and 18 significant improvements can be observed in the constellation (which is much tighter) and the spectral regrowth, in comparison to the constellation and the spectral regrowth of FIGS. 14 respectively 15 (which correspond to the use of the phase shifter module alone, without AM-FM predistortion).

Figure 19:
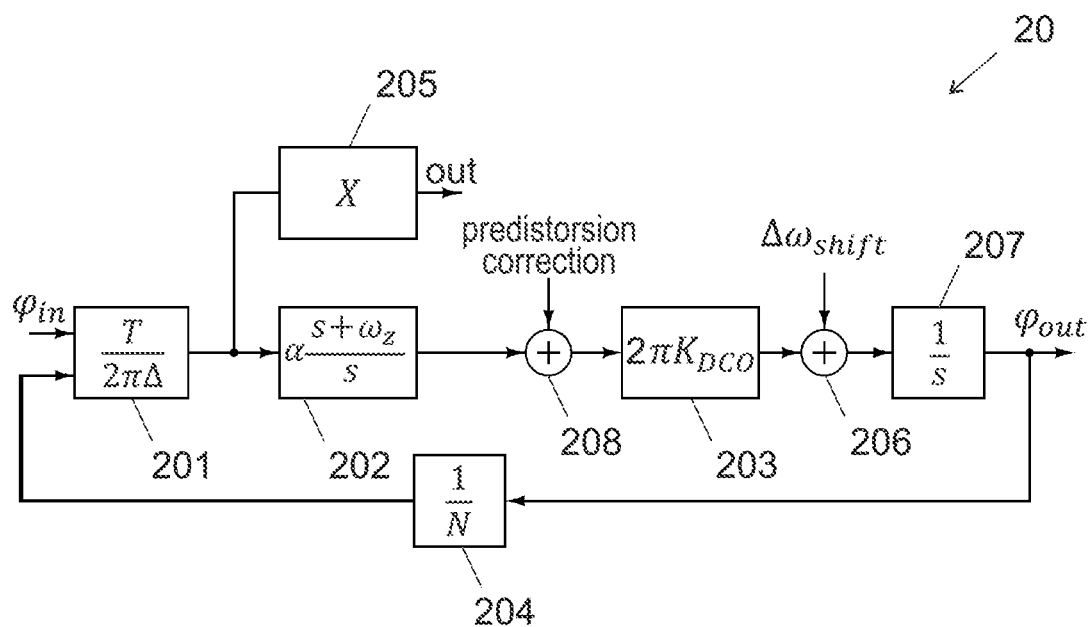
FIG. 19 shows one embodiment of an ADPLL with a predistortion correction of the RF transmitter according to the invention.

FIG. 19 shows one embodiment of an ADPLL 20 with a predistortion correction of the RF transmitter according to the invention. With regard to the embodiment of FIG. 12, a predistortion correction 208 is added between the loop filter 202 and the oscillator 203.

Figure 20:
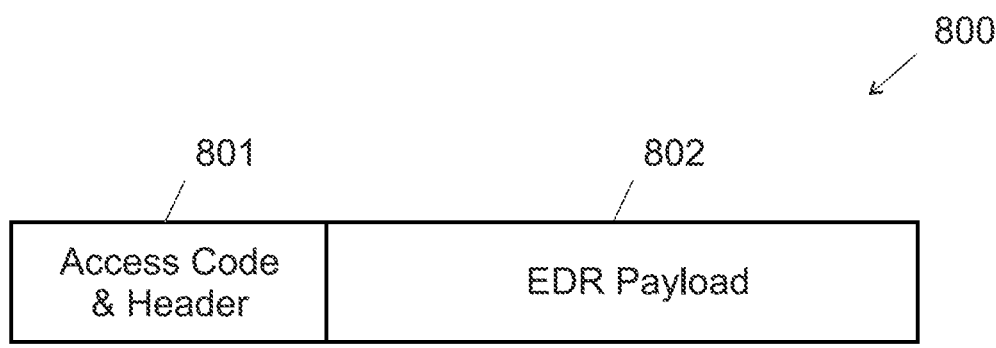
FIG. 20 shows a simplified BT EDR packet structure.

FIG. 20 shows a simplified BT EDR packet structure 800. Access Code & Header portion 801 uses e.g. a GFSK modulation. At the beginning of this portion 801 of the packet 800, the PA envelop ramps up. As the PA is ramped up, the PLL is used to sample the remaining frequency shift, in order to build a [frequency shift-signal envelope] look-up table.

This information is subsequently used during the EDR portion 802 of the packet 800 as a predistortion signal added (as for example illustrated in FIGS. 19) to the oscillator frequency control input, in order to cancel the frequency shift due to pushing/pulling.

Figure 21:
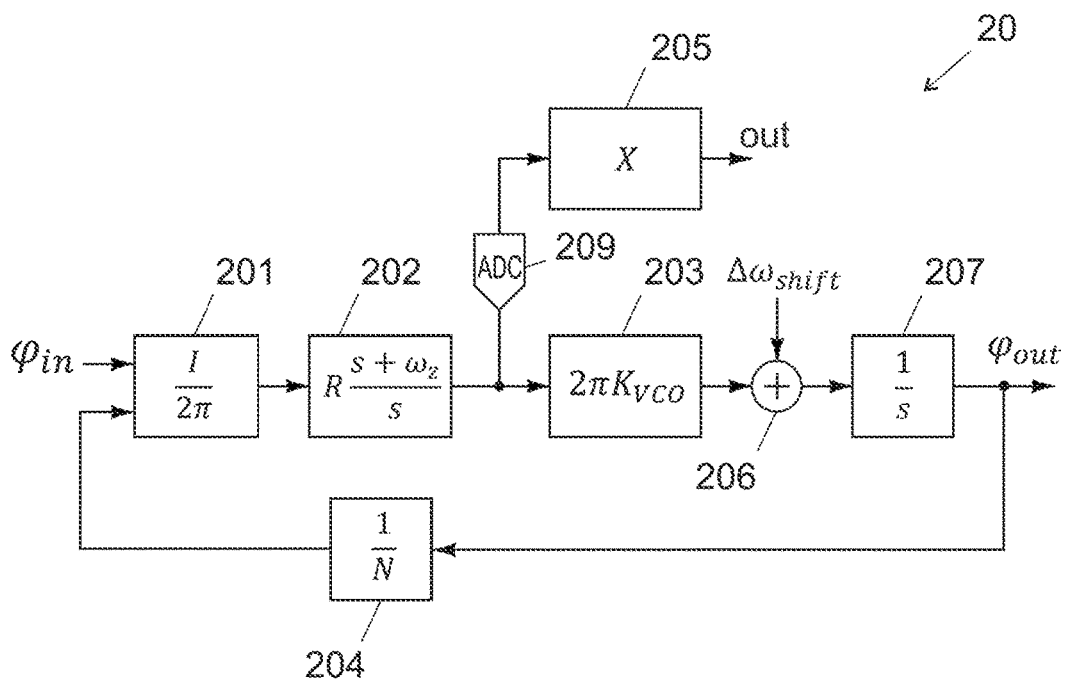
FIG. 21 shows one embodiment of a charge pump PLL of the RF transmitter according to the invention.

FIG. 21 shows one embodiment of a charge pump PLL 20 of the RF transmitter according to the invention. For the embodiment, the additional module 205 works according to the following formula:

$$X = \left(\frac{1}{2\pi K_{DCO}}\right) \cdot \frac{s^2 + 2\zeta\omega_n s + \omega_n^2}{\frac{K_D}{N} R(s + \omega_z)} \cdot \frac{\omega_p}{s + \omega_p} \quad (15)$$

wherein $K_{VCO}$ is the oscillator gain
$K_D = I/(2\pi)$ is the phase detector module gain
I is the charge pump current
R is loop filter resistor
out is the output signal of the additional module
$\omega_p = 2\pi f_p$ is the bandwidth of the measurement
$\omega_n$ is PLL natural angular frequency
$\omega_z$ is PLL loop filter zero frequency
N is the PLL feedback divider
$\zeta$ is the PLL damping factor The charge pump PLL 20 of FIG. 21 comprises an ADC 209 which converts to digital the voltage at the oscillator (VCO) input. The charge pump PLL 20 of FIG. 21 is an alternative embodiment to the PLL of FIG. 12.

Figure 22:
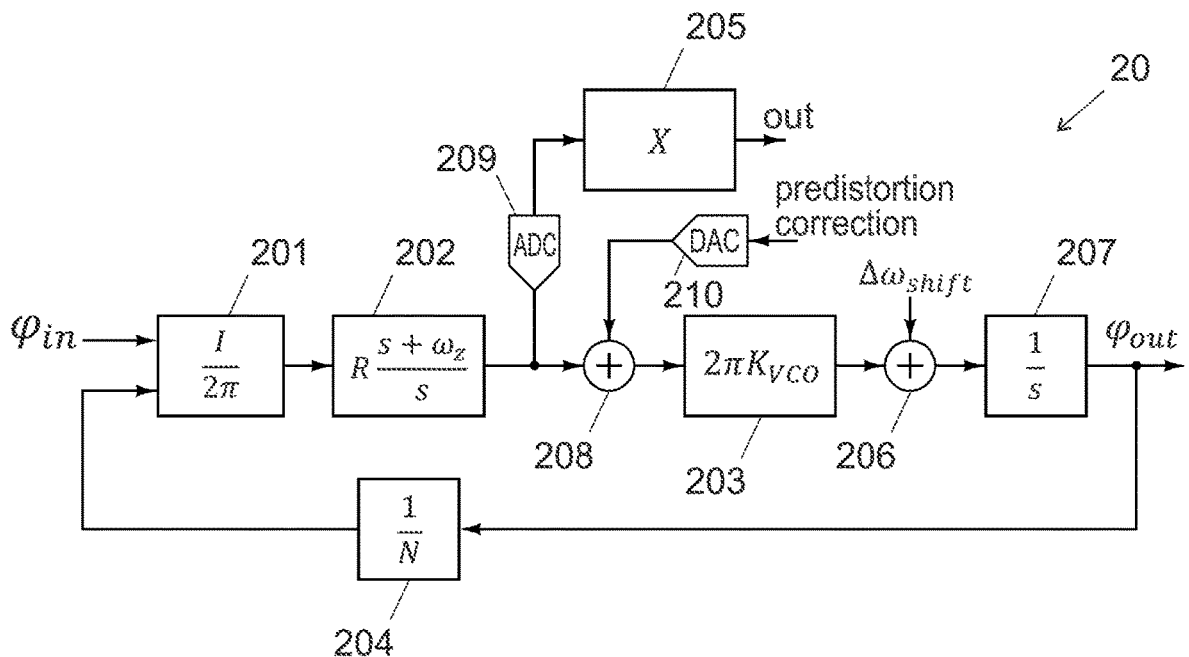
FIG. 22 shows the charge pump PLL of FIG. 21, with a predistortion correction.

FIG. 22 shows the charge pump PLL of FIG. 21, with a possible implementation of a predistortion correction. In the illustrated embodiment, the predistortion correction is added to the oscillator input using a DAC 210. The charge pump PLL 20 of FIG. 22 is an alternative embodiment to the PLL of FIG. 19.

Figure 23:
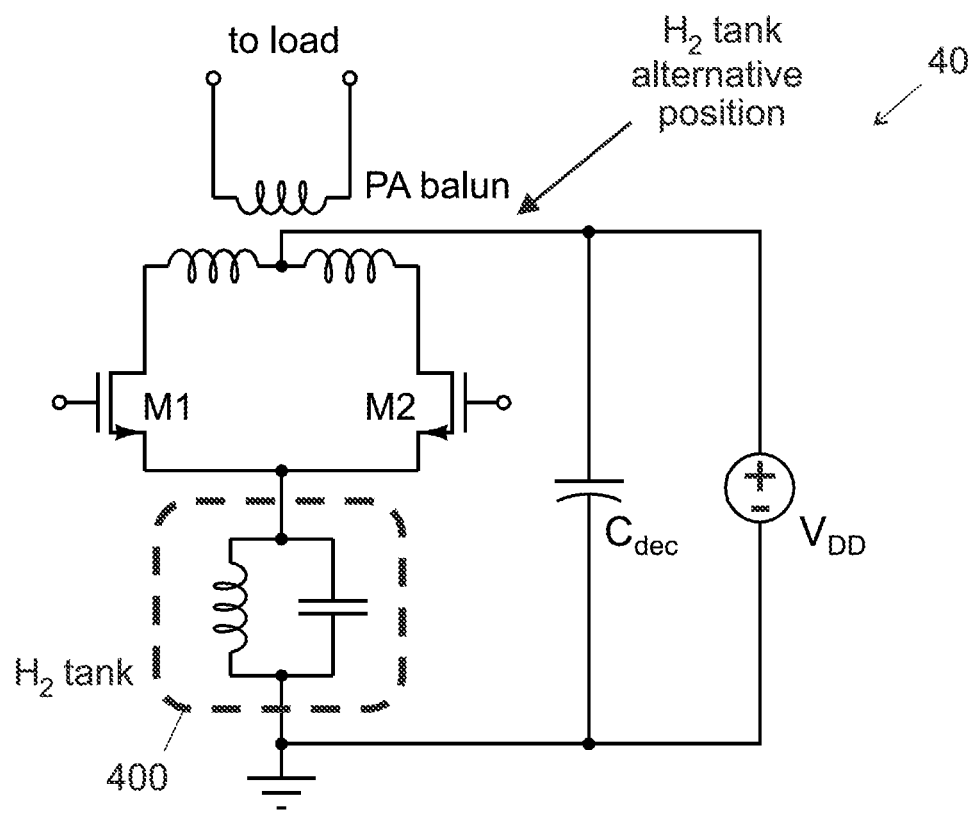
FIG. 23 shows one embodiment of a PA of the RF transmitter according to the invention, comprising a tank arranged to impede a flow of a harmonic current before it reaches a power amplifier decoupling capacitor.

FIG. 23 shows one embodiment of a PA 40 of the RF transmitter according to the invention, comprising a tank 400 arranged to impede a flow of a harmonic current (e.g. of the second harmonic PA current $H_2$) before it reaches a power amplifier decoupling capacitor $C_{dec}$.

This PA harmonic current is common-mode. The additional tank 400 illustrated comprises an inductor and a capacitor in parallel. It presents an impedance at the harmonic equal or higher than 100Ω), in particular equal or higher than a few hundred ohms, for example equal or higher than 1 KΩ), at the harmonic current and impedes then the flow of the second harmonic PA current before it reaches the decoupling capacitor $C_{dec}$.

The tank 400 could be placed between the active part comprising transistors M1 and M2 and a fixed voltage (e.g. the ground in FIG. 23). In complement or in alternative, the tank can be placed in correspondence of the PA balun, as indicated by the arrow in FIG. 23. In both cases, the tank 400 shares a terminal with a terminal of the coupling capacitor $C_{dec}$.

Thanks to the presence of the tank 400, the (second) harmonic magnetic radiation from the balun and the PA supply/ground lines is therefore significantly reduced.

Figure 24:
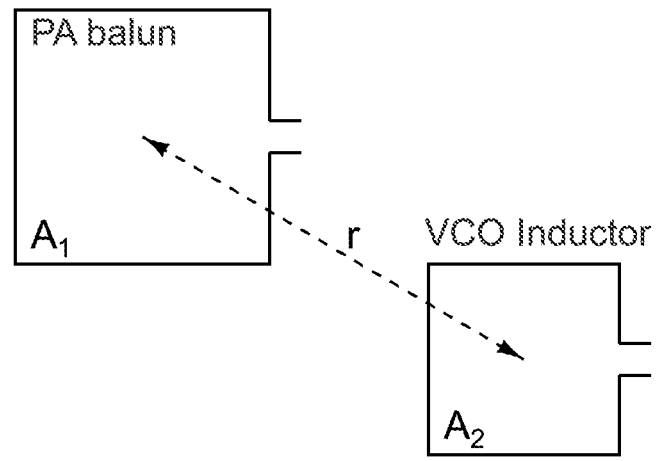
FIG. 24 shows a known magnetic coupling from a PA balun to a LC-tuned oscillator's inductor.
Figure 25:
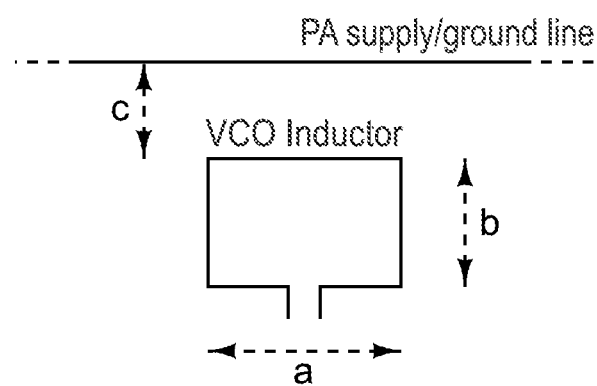
FIG. 25 shows a known magnetic coupling from PA ground/supply lines to a LC-tuned oscillator's inductor.

FIG. 24 shows a known magnetic coupling from a PA balun to a LC-tuned oscillator's inductor. FIG. 25 shows a known magnetic coupling from PA ground/supply lines to a LC-tuned oscillator's inductor.

The magnetic coupling from the PA to the LC-tuned oscillator can be either:
magnetic coupling from the PA balun to the oscillator's inductor,
magnetic coupling from the PA ground/supply lines to the oscillator's inductor.

With reference to FIG. 24, the magnetic coupling from the PA balun to the oscillator's inductor can be reasonably accurately described by the following dipole-approximation formula:

$$M \approx \frac{\mu A_1 A_2}{4\pi r^3} \tag{16}$$

wherein
$A_1$, $A_2$ are the areas of the PA balun and the oscillator's inductor respectively,
r is the distance between the center of the PA balun and the center of the oscillator's inductor, and it is assumed to be at least 2-3 times the edge length of the structures.

With reference to FIG. 25, the magnetic coupling from the PA ground/supply lines to the oscillator's inductor can be approximated by the coupling from an infinite line to a loop (the oscillator's inductor), as indicated in the following formula:

$$M = \frac{\mu a}{2\pi} \ln\left(1 + \frac{b}{c}\right) \tag{17}$$

wherein
a, b are the dimensions of the oscillator's inductor
c is the distance between the oscillator's inductor and the PA ground/supply lines FIGS. 26 to 30 show a possibility to further minimize pushing/pulling both at the PA and the oscillator by circuit design techniques and/or careful layout.

Figure 26:
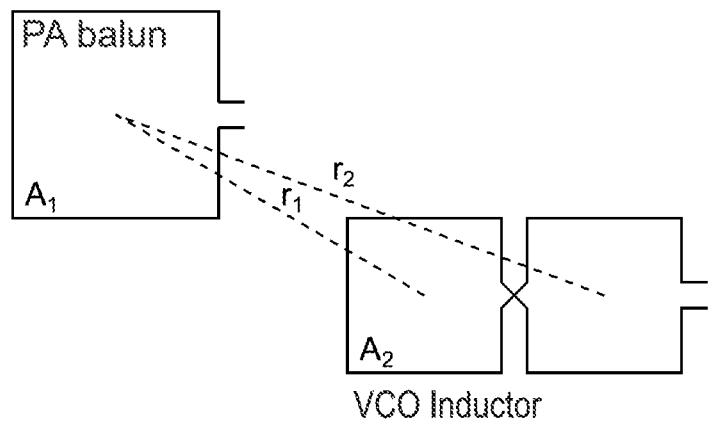
FIG. 26 shows a magnetic coupling from the PA balun to the LC-tuned oscillator's inductor according to one embodiment of the invention.

FIG. 26 shows a magnetic coupling from the PA balun to the LC-tuned oscillator's inductor according to one embodiment of the invention. The aim of this embodiment is to design the oscillator's inductor in a magnetically immune fashion.

In the embodiment of FIG. 26, the inductor of the oscillator is designed so as have an eight shape. With reference to FIG. 26, a good immunity can be achieved for sufficiently large separations for which $r_1 \approx r_2$ according to the following formula:

$$M \approx \frac{\mu A_1 A_2}{4\pi}\left(\frac{1}{r_1^3} - \frac{1}{r_2^3}\right) \tag{18}$$

wherein
$r_1$, $r_2$ are the distances between the centers of each half-eight of the oscillator's inductor and the center of the PA balun.

Figure 27:
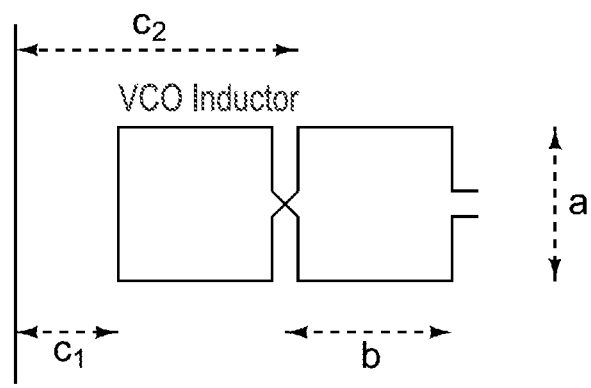
FIG. 27 shows a magnetic coupling from PA ground/supply lines to a LC-tuned oscillator's inductor according to one embodiment of the invention.

FIG. 27 shows a magnetic coupling from PA ground/supply lines to a LC-tuned oscillator's inductor according to one embodiment of the invention. With reference to FIG. 27, a good immunity can be achieved for sufficiently large separations for which $c_1 \approx c_2$ according to the following formula:

$$M \approx \frac{\mu a b}{2\pi}\left(\frac{1}{c_1} - \frac{1}{c_2}\right) \tag{19}$$

wherein
$c_1$, $c_2$ are the distances between each half-eight of the oscillator's inductor and PA ground/supply lines.

Figure 28:
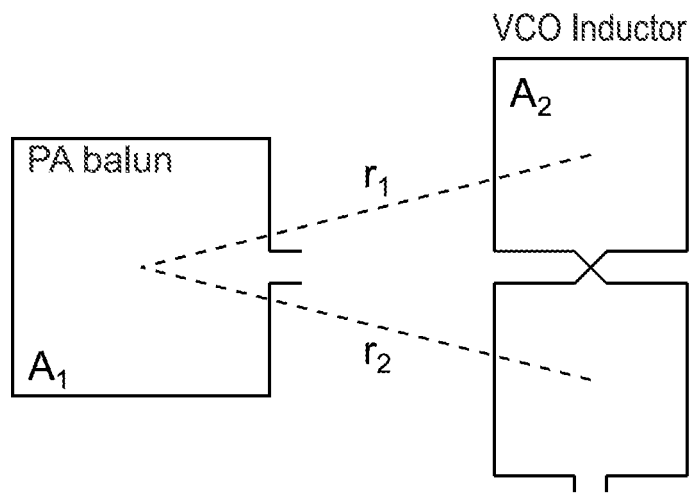
FIG. 28 shows a magnetic coupling from the PA balun to the LC-tuned oscillator's inductor according to one embodiment of the invention (symmetrical placing).
Figure 29:
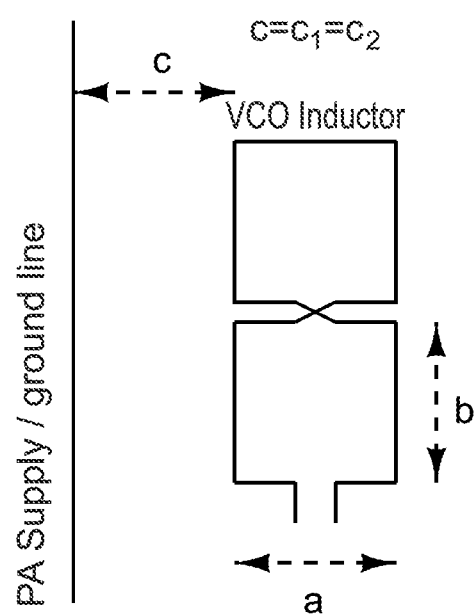
FIG. 29 shows magnetic coupling from PA ground/supply lines to a LC-tuned oscillator's inductor according to one embodiment of the invention (symmetrical placing).

FIG. 28 shows a magnetic coupling from the PA balun to the LC-tuned oscillator's inductor according to one embodiment of the invention (symmetrical placing). FIG. 29 shows magnetic coupling from PA ground/supply lines to a LC-tuned oscillator's inductor according to one embodiment of the invention (symmetrical placing).

In both cases of FIGS. 28 and 29, a symmetric placing (i.e. $r_1=r_2$ and $c_1=c_2$) gives the best results M≈0.

Figure 30:
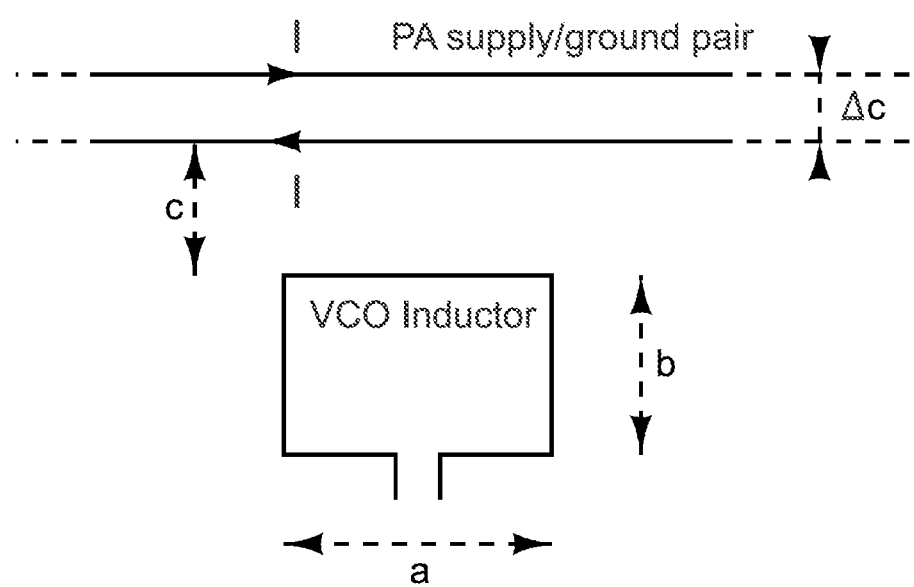
FIG. 30 shows magnetic coupling from PA ground/supply lines laid out in pairs to a LC-tuned oscillator's inductor according to one embodiment of the invention.

FIG. 30 shows magnetic coupling from PA ground/supply lines laid out in pairs to a LC-tuned oscillator's inductor according to one embodiment of the invention.

With reference to FIG. 30, supply/ground lines emanating from the PA can be made magnetically immune if they are laid out in pairs. The mutual coupling is given by the following formula:

$$M \approx \frac{\mu a b}{2\pi}\left(\frac{b \Delta c}{(b+c)c}\right) \tag{20}$$

wherein
$\Delta c$ is the distance between each supply/ground line of the pair.

By reducing $\Delta c$, it is possible to reduce magnetic coupling M from the PA ground/supply lines to the oscillator's inductor.

Pushing of the oscillator could also be minimized with careful grounding, good local decoupling, and star-routing of supplies/grounds. Additionally, regulators help to provide adequate power supply rejection (PSR) and/or boost the immunity of the oscillator to external disturbances.

The invention claimed is:
1. A RF transmitter comprising:
a phase-locked loop, comprising an oscillator arranged to output an oscillator carrier,
a power amplifier, arranged to conduct a power amplifier current, a phase shifter module between the phase-locked loop and the power amplifier, arranged to introduce a phase shift between the oscillator carrier and a harmonic of the power amplifier current, in order reduce a frequency shift of the oscillator carrier due to pushing and/or pulling, a computing unit, and an oscillator frequency shift measurement unit, wherein:

the power amplifier is arranged to be ramped-up during a calibration phase, the phase shifter module is arranged so that during this calibration phase, the variable phase shift takes different values, the measurement unit is arranged to measure the oscillator frequency shift against a load power for each value of the phase shift, the computing unit is arranged to select the value of the phase shift minimizing a peak-peak oscillator frequency shift against the load power, the measurement unit is the phase-locked loop and comprises a phase detector module and an additional module connected to an output of the phase detector module, the additional module is arranged so as to compute the oscillator frequency shift, the phase shifter module comprises several selectable delay cells, each delay cell comprising several inverters, and a control module comprises:

a temperature sensor, and a potentiometer comprising a p-output and a n-output, wherein the temperature sensor is arranged to control the n-output and the p-output, and the n-output and the p-output is arranged to control fourth terminals of N-type and P-type transistors of the several inverters, respectively.

2. The RF transmitter of claim 1, comprising a divider connected to the output of the oscillator and being arranged to divide the frequency of the oscillator carrier by a number, the phase shifter module being between the divider and the power amplifier.

3. The RF transmitter of claim 1, the phase shift of the phase shifter module being a variable phase shift.

4. The RF transmitter of claim 1, the phase-locked loop being an all-digital phase-locked loop.

5. The RF transmitter of claim 1, each delay cell comprises back-to-back inverters so as to control the harmonic of the power amplifier current.

6. The RF transmitter of claim 1, the phase shifter module comprising the control module, arranged to control the fourth terminal of at least some transistors for temperature compensation.

7. The RF transmitter of claim 1, wherein as the power amplifier is ramped up and the measurement unit measures the frequency shift, the computing unit is arranged to build a frequency shift-signal envelope look-up table.

8. The RF transmitter of claim 7, wherein after the calibration phase, a predistortion signal based on said look-up table is added to an oscillator frequency control input, in order to reduce further the frequency shift of the oscillator carrier due to pushing and/or pulling.

9. The RF transmitter of claim 1, wherein the power amplifier comprises a power amplifier decoupling capacitor and a tank, the tank sharing a terminal with a terminal of the decoupling capacitor and having an impedance at the harmonic equal or higher than 100Ω in order to reduce or impede a flow of said harmonic current before it reaches the power amplifier decoupling capacitor.

10. The RF transmitter of claim 1, an inductor of the oscillator having an eight shape so as to reduce a magnetic coupling between the inductor and a balun of the power amplifier and/or a supply/ground line of the power amplifier, and/or wherein the distance between the oscillator and the balun of the power amplifier, is (are) arranged so as to reduce said magnetic coupling.

* * * * *